(12) United States Patent
Jiang

(10) Patent No.: US 11,849,513 B2
(45) Date of Patent: Dec. 19, 2023

(54) LED DIMMING DEVICE WITH HIGH REFRESH RATE AND SMOOTH DIMMING

(71) Applicant: Guangzhou Haoyang Electronic Co., Ltd., Guangdong (CN)

(72) Inventor: Weikai Jiang, Guangdong (CN)

(73) Assignee: Guangzhou Haoyang Electronic Co., Ltd.

( * ) Notice: Subject to any disclaimer, the term of this patent is extended or adjusted under 35 U.S.C. 154(b) by 122 days.

(21) Appl. No.: 17/490,359

(22) Filed: Sep. 30, 2021

(65) Prior Publication Data
US 2022/0022294 A1 Jan. 20, 2022

Related U.S. Application Data

(63) Continuation of application No. PCT/CN2020/111830, filed on Aug. 27, 2020.

(30) Foreign Application Priority Data

Feb. 28, 2020 (CN) .......................... 202020228488.4

(51) Int. Cl.
*H05B 45/14* (2020.01)
*H05B 45/345* (2020.01)
(Continued)

(52) U.S. Cl.
CPC ........... *H05B 45/14* (2020.01); *H05B 45/325* (2020.01); *H05B 45/345* (2020.01); *H05B 45/375* (2020.01)

(58) Field of Classification Search
CPC ...... H05B 45/10; H05B 45/14; H05B 45/345; H05B 45/325; H05B 45/37; H05B 45/375; H05B 47/25
See application file for complete search history.

(56) References Cited

U.S. PATENT DOCUMENTS 8,487,546 B2 * 7/2013 Melanson .............. H05B 45/14
 315/297
9,538,601 B1 * 1/2017 Mangtani .......... H05B 45/3725
(Continued)

FOREIGN PATENT DOCUMENTS

CN 102740545 A * 10/2012 ......... H05B 33/0815
CN 105228312 A 1/2016
(Continued)

OTHER PUBLICATIONS

International Search Report for Application No. PCT/CN2020/111830, dated Nov. 27, 2020, 2 pages.
(Continued)

*Primary Examiner* — Abdullah A Riyami
*Assistant Examiner* — Syed M Kaiser
(74) *Attorney, Agent, or Firm* — Lerner David LLP

(57) ABSTRACT

An LED dimming device with a high refresh rate and smooth dimming includes a constant current source circuit and an LED dimming circuit that are sequentially connected in series. The LED dimming circuit includes an LED and a first electronic switch. A positive electrode of the LED is connected to an output end of the constant current source circuit. The first electronic switch is connected in parallel at both ends of the LED. The LED dimming device further includes an energy release circuit and a first control circuit. The energy release circuit is connected in series with the first electronic switch to release excess energy in the constant current source circuit. The first control circuit is connected to the first electronic switch to control turning on or off of the first electronic switch.

15 Claims, 2 Drawing Sheets

(51) Int. Cl.
*H05B 45/325* (2020.01)
*H05B 45/375* (2020.01)

(56) References Cited

U.S. PATENT DOCUMENTS

| | | | | |
|---|---|---|---|---|
| 2010/0109535 A1* | 5/2010 | Lin | ................. | H05B 45/48 |
| | | | | 315/149 |
| 2010/0164404 A1* | 7/2010 | Shao | ................. | H05B 45/14 |
| | | | | 315/297 |
| 2011/0273098 A1* | 11/2011 | Grajcar | ............. | H05B 45/3575 |
| | | | | 315/186 |
| 2013/0162150 A1* | 6/2013 | Masuda | ................. | H05B 45/46 |
| | | | | 315/186 |
| 2014/0159598 A1 | 6/2014 | Boezen | | |
| 2017/0332453 A1* | 11/2017 | Yoon | ................... | H05B 45/355 |
| 2018/0283637 A1 | 10/2018 | Murakami et al. | | |

FOREIGN PATENT DOCUMENTS

| | | | | |
|---|---|---|---|---|
| CN | 206118126 U | 4/2017 | | |
| CN | 108243542 A * | 7/2018 | ......... | G03B 21/2033 |
| CN | 109392216 A | 2/2019 | | |
| CN | 111148316 B * | 6/2022 | ............... | B60Q 1/00 |
| EP | 3240369 A1 * | 11/2017 | ............ | H02M 1/083 |
| JP | 5995122 B2 * | 9/2016 | | |
| WO | WO-2015165925 A1 * | 11/2015 | ........... | H05B 33/083 |
| WO | 2015196443 A1 | 12/2015 | | |

OTHER PUBLICATIONS

Extended European Search Report for Application No. 20921687.8 dated Jul. 5, 2023. 10 pgs.

\* cited by examiner

LED DIMMING DEVICE WITH HIGH REFRESH RATE AND SMOOTH DIMMING

CROSS REFERENCE TO RELATED APPLICATIONS

The present application is a continuation of International Application No. PCT/CN2020/111830, filed on Aug. 27, 2020, which claims priorities from Chinese Patent Application No. 202020228488.4 filed on Feb. 28, 2020, all of which are hereby incorporated herein by reference.

TECHNICAL FIELD

The present invention relates to the technical field of LED lighting, and more particularly to an LED dimming device with a high refresh rate and smooth dimming.

BACKGROUND

Currently, in an LED dimming circuit, a constant current source output current is typically maintained stable by quickly charging and discharging an inductor through a switch of a MOSFET (metal oxide semiconductor field effect transistor), in which the constant current source regulates an output current through pulse-width modulation (PWM). The PWM can output a higher frequency and perform several periodic regulations in a certain period of time. Currently, two methods are often used in order to improve resolution of LED dimming. One method is connecting an electronic switch in parallel at both ends of an LED. The electronic switch is typically a MOSFET, and a flow direction of the current is quickly controlled by MOSFET conduction, so that the LED can be turned off quickly over a plurality of cycles to achieve a smooth dimming effect. Another method is connecting a MOSFET at the negative electrode of the LED to increase the resolution of LED dimming by quickly turning off the MOSFET.

However, the above two methods often lead to a problem of non-smooth LED dimming. When the MOSFET is turned on, internal resistance thereof is typically as low as a mΩ level, and thus energy of the inductor is difficult to be consumed by the MOSFET connected in parallel or in series at both ends of the LED before the MOSFET of the constant current source in a next cycle is turned on. If the energy of the inductor in a previous cycle has insufficient time to be consumed, an inductor current of the previous cycle may act on the charging and discharging of the inductor in the next cycle since the current at both ends of the inductor cannot be mutated. Therefore, in such case, when the MOSFET in the next cycle is turned on, the inductor current increases, which affects the stability of the constant current source output current and leads to nonlinear and non-smooth LED dimming effect.

SUMMARY

The present invention aims thus provides an LED dimming device with a high refresh rate and smooth dimming to solve the problem of non-smooth LED dimming.

According to the present invention, an LED dimming device with a high refresh rate and smooth dimming comprises a constant current source circuit and an LED dimming circuit that are sequentially connected in series. The LED dimming circuit comprises an LED and a first electronic switch. A positive electrode of the LED is connected to an output end of the constant current source circuit, and the first electronic switch is connected in parallel with the LED. The LED dimming device further comprises an energy release circuit and a first control circuit. The energy release circuit is connected in series with the first electronic switch to accelerate releasing the excess energy in the constant current source circuit. The first control circuit is connected to the first electronic switch to control turning on or off of the first electronic switch.

The LED dimming device with a high refresh rate and smooth dimming according to the present invention is a modification based on existing LED dimming circuits by adding an energy release circuit and a first control circuit to quickly release the excess energy generated in the constant current source circuit in each cycle. An entire circuit in the present invention comprises two parts: a constant current source circuit and an LED dimming circuit, in which the constant current source circuit can provide a constant current, and the LED dimming circuit can adjust luminous flux and illumination level of the LED to uniformize brightness of a light source and comprises the LED and the first electronic switch. Based on the LED dimming circuit, the present invention adds the energy release circuit and the first control circuit, and specific connection relationships in the LED dimming device include: an output end of the constant current source circuit is connected to the positive electrode of the LED, a negative electrode of the LED is connected to the ground, the first electronic switch can be connected in parallel at both ends of the LED or can be connected in series to the negative electrode of the LED, the energy release circuit is connected to a positive or a negative electrode of the first electronic switch, and the first control circuit is connected to the first electronic switch to control turning on or off of the first electronic switch. According to the present invention, the first electronic switch is controlled to be turned on or off quickly by the first control circuit, thereby enabling the energy release circuit connected in series with the first electronic switch to release the excess energy generated by an inductor element in the constant current source in each cycle more quickly, avoiding unreleased energy to influence charging and discharging of the inductor element in a subsequent cycle, allowing the constant current source to output a current with stable and uniform variation, and achieving a smooth and uniform dimming effect.

The constant current source circuit can be a DC-DC converter circuit.

The DC-DC converter circuit is a voltage converter circuit that effectively outputs a fixed voltage after changing an input voltage, having three types: a boost DC-DC converter circuit, a buck DC-DC converter circuit, and a buck-boost DC-DC converter circuit. The present invention can adopt any DC-DC converter circuit as a constant current source circuit.

The constant current source circuit can include a second electronic switch, an inductor element, a second control circuit and a freewheeling semiconductor component. The second electronic switch is connected in series at one end of the inductor element, the other end of the inductor element is connected to the positive electrode of the LED, the second control circuit is connected to the second electronic switch to control turning on or off of the second electronic switch, and the freewheeling semiconductor component is connected between the positive electrode of the inductor element and the ground.

The constant current source circuit adopted in the present invention is a buck DC-DC converter circuit with an output voltage smaller than or equal to an input voltage, and wide load range. The buck DC-DC converter circuit according to the present invention comprises a second electronic switch, an inductor element, a second control circuit and a freewheeling semiconductor component, and specific circuit connection relationships include: the second electronic switch is connected in series at one end of the inductor element, the other end of the inductor element is connected to the positive electrode of the LED, the second control circuit is connected to the second electronic switch to control turning on or off of the second electronic switch, the positive electrode of the freewheeling semiconductor component is connected to one end of the inductor element while the other end is connected to the ground. The freewheeling semiconductor component in the present invention can be a diode or a MOSFET capable of maintaining continuous output current of the constant current source. The operating principle of the freewheeling semiconductor component is that a diode or a MOSFET is connected in parallel at both ends of the inductor element, when a current flows through the inductor element, an induced electromotive force is generated at both ends thereof, and when the current vanishes, the induced electromotive force thereof generates an inverse voltage to the elements in the circuit. What's more, with the configuration of the diode or the MOSFET being connected in parallel at both ends of the inductor element, when the current flowing through the inductor vanishes, the induced electromotive force generated by the inductor element is consumed through work done by a circuit formed by the diode and a coil, thereby safely protecting other elements in the circuit.

The first control circuit is configured to control the turning on or off of the first electronic switch by controlling a pulse width of the PWM.

The second control circuit may also control the turning on or off of the second electronic switch by controlling the pulse width of the PWM.

The constant current source circuit adopted in the present invention is a DC-DC converter circuit, and can use three types of control circuit according to requirements of the converter circuit, including PWM control circuit, PFM control circuit, and PWM/PFM convert control circuit. The present invention adopts a PWM control circuit, in which both the first control circuit and the second control circuit control the turning on or off of the first electronic switch and the second electronic switch through PWM, a cycle of a control signal is maintained unchanged when an input voltage is changed, and the on-time of the electronic switch is changed by changing a pulse output width, so that the output voltage is stable with high efficiency and has good output voltage ripple and noise.

In this invention, when the first electronic switch is connected in parallel at both ends of the LED, a turn-on signal for controlling the first electronic switch and a PWM signal for controlling the second electronic switch are in reverse phase.

According to the connection relationship between the first electronic switch and the LED, a corresponding control signal is selected for the purposes of the present invention. When the first electronic switch is connected in parallel at both ends of the LED, the turn-on signal for controlling the first electronic switch and the PWM signal for controlling the second electronic switch are in reverse phase, so that the first electronic switch can be turned on quickly when the second electronic switch is turned off in each dimming cycle, therefore the energy of the inductor element in the previous dimming cycle can rapidly flow to a resistor, and the resistor can quickly consume the excess energy of the inductor element in the previous dimming cycle. The above design of circuit connections guarantees that the energy of the inductor element in the previous dimming cycle can quickly flow to the energy release circuit and quickly release the excess energy of the inductor element in the previous dimming cycle in order to avoid affecting the stability of the output current of the constant current source in the next dimming cycle.

According to the present invention, the LED dimming circuit can further include a third electronic switch connected in series with the LED.

The third electronic switch connected in series with the LED can control quick on-off of the circuit where the LED is located, thereby increasing LED frequency and improving the dimming effect.

The first electronic switch can be an N-channel MOSFET.

A MOSFET including a P-type substrate and two high concentration N diffusion regions is referred to as an N-channel MOSFET. When the tube is conducted, an N-type conduction channel is formed between the two high concentration N diffusion regions. An N-channel enhanced MOSFET refers to an N-channel MOSFET in which a forward bias must be applied on a gate and only a conduction channel is generated when a gate-source voltage is greater than a threshold voltage. An N-channel depletion MOSFET refers to an N-channel MOSFET in which a conduction channel is generated when no gate voltage is applied (the gate-source voltage is zero). The present invention adopts a circuit formed of N-channel MOSFETs, which has high input impedance, substantially does not need absorption current, and thus a current load problem does not have to be considered when a CMOS integrated circuit is connected to an NMOS integrated circuit.

The second electronic switch is a MOSFET.

The second electronic switch in the present invention adopts a MOSFET, and both P-channel MOSFET and N-channel MOSFET can be adopted. A P-channel MOSFET has two P+ regions on an N-type silicon substrate, referred to as a source electrode and a drain electrode respectively with no conduction therebetween, a sufficient positive voltage (the source electrode connects the ground) is applied to the gate, and an N-type silicon surface under the gate presents a P-type inversion layer as a channel connecting the source electrode and the drain electrode. Changing the gate voltage can change electron density in the channel, thereby changing the channel resistance. PMOS circuit control is simple, and a PMOS circuit technology can be adopted for a digital control circuit of the present invention.

In the present invention, the energy release circuit includes a resistor, which has a resistance value greater than or equal to 0.3 ohms and smaller than or equal to a LED resistance value of the LED.

The energy release circuit may includes a resistor or other working elements or an energy storage circuit capable of collecting excess energy to provide power for an appliance. The energy release circuit in the present invention includes a resistor, the number of which may be one or more, the resistance value thereof is greater than or equal to 0.3 ohms to effectively consume the excess energy in the previous dimming cycle while the resistance value is smaller than or equal to the resistance value of the LED itself. If the resistance value is greater than the LED resistance value, when the resistor is connected in parallel with the LED, the current flowing through the LED may be greater than the current flowing through the resistor, thereby affecting a quick turning off of the LED.

Compared with the prior art, the present invention can obtain some beneficial effects. The present invention comprises the energy release circuit and the first control circuit in the LED dimming circuit, the first electronic switch is controlled to be turned on or off quickly by the first control circuit, thereby enabling the energy release circuit connected in series with the first electronic switch to release the excess energy generated by the inductor element in the constant current source circuit in each cycle more quickly, avoiding unreleased energy to influence charging and discharging of the inductor element in a subsequent cycle, allowing the constant current source to output a current with stable and uniform variation, and achieving a smooth and uniform dimming effect.

On the other hand, the present invention further provides another LED dimming device with a high refresh rate and smooth dimming, including a light source and a power circuit for driving the light source. The power circuit comprises an inductor element. The LED dimming device further comprises an energy release circuit connected in parallel with the light source to release the excess energy of the inductor element, and a first electronic switch connected in series with the energy release circuit to control the energy release circuit and driven by the first control circuit.

By providing the energy release circuit connected in parallel with the light source, the first electronic switch connected in series with the energy release circuit, and controlling quick on-off of the first electronic switch in time using the first control circuit, the present invention enables the energy release circuit to release the excess energy generated by the inductor element in the power circuit in each cycle more quickly, thereby avoiding unreleased energy to influence charging and discharging of the inductor element in a subsequent cycle, allowing the power circuit to output a current with stable and uniform variation, and achieving a smooth and uniform dimming effect.

According to the present invention the energy release circuit can include a resistive load.

The excess energy generated by the inductor element in the previous cycle can be released completely before the next cycle using the resistive load, instead of an inductive load that releases energy in the next cycle after energy accumulation and affects smooth dimming of the light source. The resistive load may be a common resistor, a heating coil, or a resistive light source.

The resistance value of the resistive load is $$R \leq \frac{2}{f \cdot L \cdot I^2} U_{LED\_THR}^2,$$

where f is a PWM control signal frequency in the power circuit, L is an inductance value of the inductor element in the power circuit, I is a full-load current of the light source, and $U_{LED\_THR}$ is a minimum turn-on voltage threshold of the light source.

When the resistance value of the resistive load is higher, an assigned voltage will be higher. If an effective value $U_{rms}$ of the voltage at both ends of the resistive load exceeds the minimum turn-on voltage threshold $U_{LED\_THR}$ of a light source LED, at which time current flows through the light source connected in parallel on the resistive load to produce lighting with low brightness that affects the effect, and thus the resistance value $$R \leq \frac{2}{f \cdot L \cdot I^2} U_{LED\_THR}^2$$

of the resistive load is needed.

Further, rated power of the resistive load is $$P \geq \frac{f \cdot L \cdot I^2 (1 - e^{-\left(\frac{2}{f \cdot L \cdot I} U_{LED\_THR}\right)^2})}{2},$$

where f is the PWM control signal frequency in the power circuit, L is the inductance value of the inductor element in the power circuit, I is the full-load current of the light source, and $U_{LED\_THR}$ is the minimum turn-on voltage threshold of the light source. The rated power of the resistive load can affect service life thereof, and thus controlling the rated power of the resistive load $$P \geq \frac{f \cdot L \cdot I^2 (1 - e^{-\left(\frac{2}{f \cdot L \cdot I} U_{LED\_THR}\right)^2})}{2}$$

can guarantee the service life of the resistive load.

According the present invention, the energy release circuit is connected in series with a magnetic ring for preventing ringing phenomenon.

Since any transmission line inevitably has lead resistance, lead inductance, and parasitic capacitance, and elements also have parasitic parameters (parasitic resistance, parasitic inductance, and parasitic capacitance). Therefore, a standard pulse signal easily leads to overshoot and ringing phenomena under the influences of the above transmission-line parasitic parameters and element parasitic parameters. The ringing changes the original appearance of the signal waveform to some extent, which results in that, the output current is nonlinear and the dimming effect is affected. The present invention effectively prevents the ringing and improves electromagnetic compatibility by connecting appropriate magnetic rings in series.

In the present invention a third electronic switch is connected in series with the light source to prevent lighting with low brightness electromagnetic compatibility generated by the light source due to incomplete energy release of the energy release circuit.

The third electronic switch connected in series with the light source can control quick on-off of the circuit where the light source is located, thus increasing light source frequency and improving the dimming effect.

The third electronic switch and the power circuit have the same operating state.

When the power circuit normally outputs currents under the control of the control circuit therein, the third electronic switch is turned on, so that the currents flow through the light source and drive the light source to emit light. When the power circuit stops to normally output currents under the control of the control circuit therein, the third electronic switch is turned off, so that an induced current generated by the inductor element in the power circuit cannot flow through the light source while flowing directly through the energy release circuit to be consumed, thereby avoiding lighting with low brightness generated by the light source.

The first electronic switch and the power circuit have opposite operating states.

When the power circuit normally outputs currents under the control of the control circuit therein, the first electronic switch is turned off, so that all the currents flow through the light source and drive the light source to emit light. When the power circuit stops to normally output currents under the control of the control circuit therein, the first electronic switch is turned on, so that an induced current generated by the inductor element in the power circuit is directed to flow through the energy release circuit to be consumed, thereby avoiding influence on charging and discharging of the inductor element in the next cycle, allowing the power output to have stable and uniform variation, and achieving a smooth and uniform dimming effect.

DETAILED DESCRIPTION OF THE EMBODIMENTS

Figure 1:
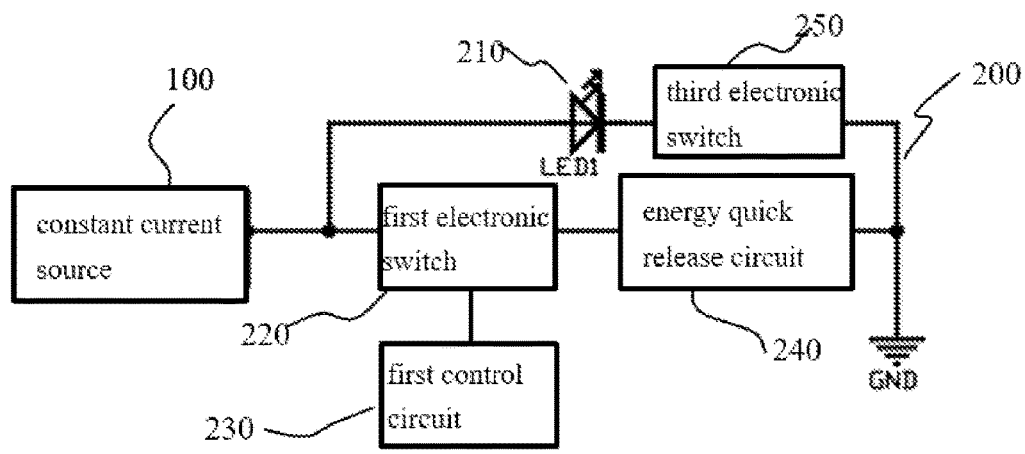
FIG. 1 is a logic circuit diagram of an embodiment according to the present invention.

The drawings of the present invention are for illustrative purposes only and are not to be construed as limiting the present invention. For better explanation of the following embodiments, some components in the drawings may be omitted, enlarged, or reduced, and sizes of these components do not represent sizes of actual products. For those skilled in the art, it will be understood that some known structures and descriptions thereof in the drawings may be omitted.

The DC-DC converter circuit is a voltage converter circuit that effectively outputs a fixed voltage after changing an input voltage, and can be divided into three types: a boost DC-DC converter circuit, a buck DC-DC converter circuit, and a buck-boost DC-DC converter circuit. The constant current source circuit in the embodiment of the present invention is a buck DC-DC converter circuit, which features in that an output voltage is smaller than or equal to an input voltage, and a load range is wide. However, the constant current source in the present invention is not limited to a buck DC-DC converter circuit, the actual circuit design can be changed in combination with the type of selected DC-DC converter circuit.

FIG. 1 shows a logic circuit diagram of an LED dimming device with a high refresh rate and smooth dimming according to one embodiment. According to this embodiment, the constant current source circuit 100 is connected in series with an LED dimming circuit 200. The LED dimming circuit 200 comprises an LED 210 and a first electronic switch 220. A positive electrode of the LED 210 is connected to an output end of the constant current source circuit 100, while a negative electrode of the LED 210 is connected to the ground, and the first electronic switch 220 is connected in parallel at both ends of the LED 210. The LED dimming device further comprises an energy release circuit 240 and a first control circuit 230, in which the energy release circuit 240 is connected in series with the first electronic switch 220 to accelerate releasing the excess energy in the constant current source circuit 100. The first control circuit 230 is connected to the first electronic switch 220 to control turning on or off of the first electronic switch 220.

Specifically, the energy release circuit 240 can adopt working elements or an energy storage circuit. The present embodiment uses a resistor, the number of which in actual application is not limited to only one. A resistance value of the resistor is greater than or equal to 0.3 ohms in order to consume excess energy and is smaller than or equal to a resistance value of the LED 210 to avoid affecting turning off the LED 210.

According to some embodiments the LED dimming circuit can further include a third electronic switch 250 connected in series with the LED 210 to control quick on-off of the circuit where the LED 210 is located, thus increasing the LED frequency and improving the dimming effect.

Figure 2:
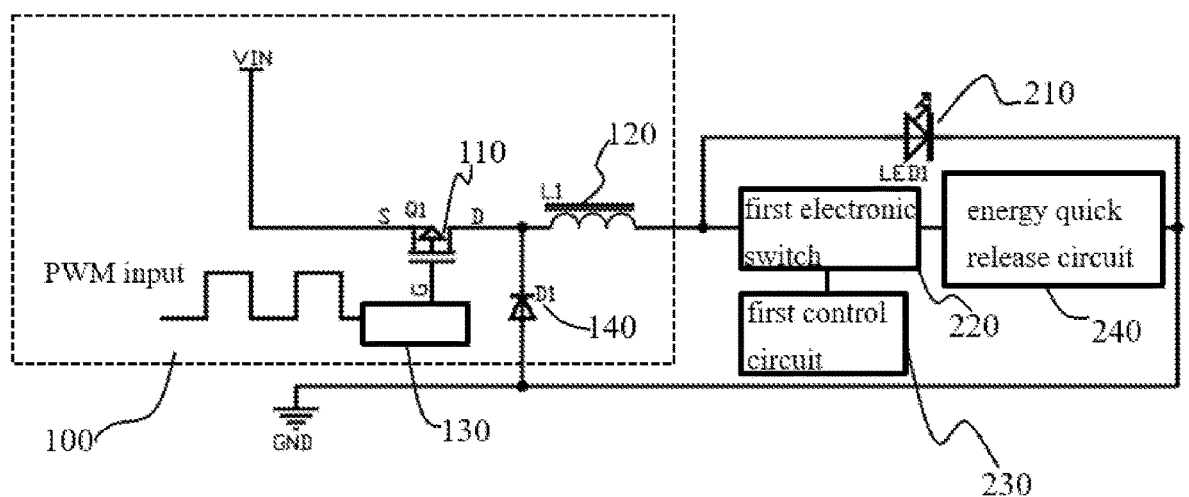
FIG. 2 is a logic circuit diagram showing a constant current source circuit uses a buck DC-DC converter circuit in the embodiment according to the present invention.

FIG. 2 is a logic circuit diagram showing a constant current source circuit uses a buck DC-DC converter circuit according to some embodiments. The constant current source circuit 100 comprises a second electronic switch 110, an inductor element 120, a second control circuit 130, and a freewheeling semiconductor component 140. Specific connection relationships include: an output end of the second electronic switch 110 is connected in series with one end of the inductor element 120, the other end of the inductor element 120 is connected to the positive electrode of the LED 210, the second control circuit 130 is connected to the second electronic switch 110 to control turning on or off of the second electronic switch 110, a positive electrode of freewheeling semiconductor component 140 is connected to the inductor element 120, and a negative electrode of freewheeling semiconductor component—140 is connected to the ground.

Figure 3:
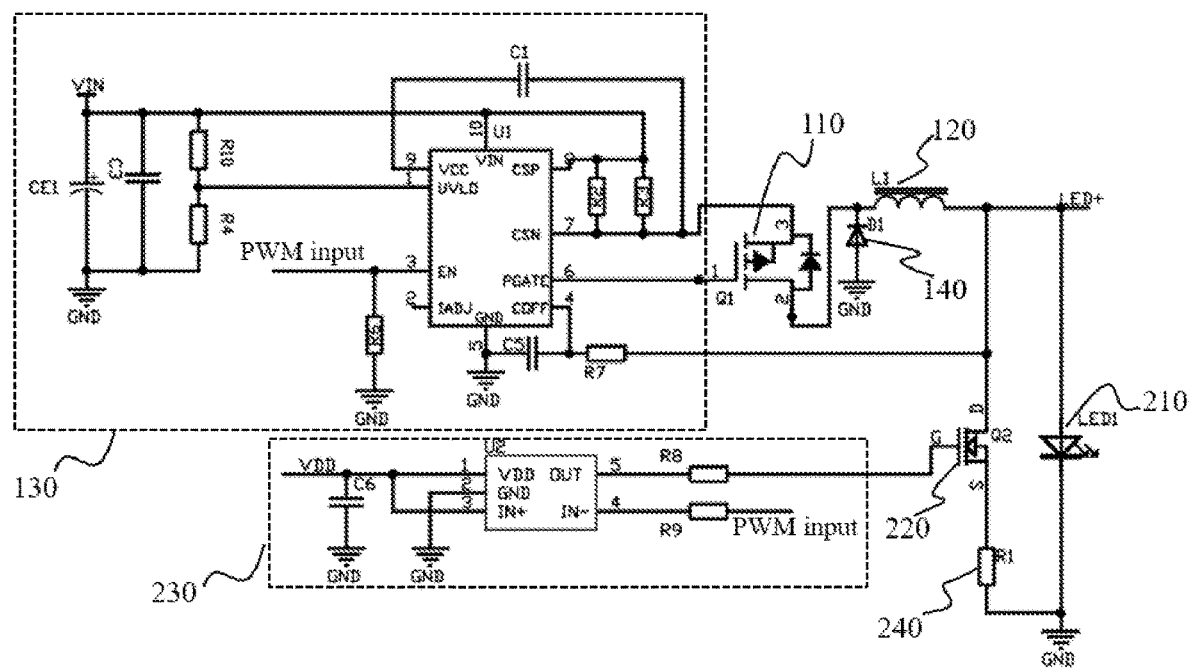
FIG. 3 is an application circuit diagram in the embodiment according to the present invention.

FIG. 3 shows an application circuit diagram according to one embodiment. The constant current source circuit 100 mainly comprises a second electronic switch 110, which is a P-channel MOSFET Q1, a diode D1 as the freewheeling semiconductor component 140, an inductor L1 as the inductor element 120, and a second control circuit 130. The second control circuit 130 is a peripheral circuit including a constant current driving chip U1, a plurality of resistors (R2, R3, R4, R6, R7, R10), and a plurality of capacitors (C1, C3, and C5). The LED dimming circuit 200 mainly comprises an LED 210, a first electronic switch 220 which is an N-channel MOSFET Q2, a resistor R1 as a part of the energy release circuit 240, and a first control circuit 230 controlling the N-channel MOSFET Q2 to be turned on or off. The first control circuit 230 is a peripheral circuit including a gate driver U2, resistors R8 and R9, and a capacitor C6.

Specifically, circuit connection relationships in the embodiment include: a gate and a source electrode of the P-channel MOSFET Q1 are connected with the constant current driving chip U1, the drain electrode of the P-channel MOSFET Q1 is connected to one end of the inductor L1, the diode D1 is connected between the inductor L1 and the ground, the positive electrode of the LED is connected to one end of the inductor L1, the negative electrode of the LED is connected with the ground, the N-channel MOSFET Q2 is connected in parallel at both ends of the LED, the first control circuit is connected to the gate of the N-channel MOSFET Q2 to control turning on or off of the N-channel MOSFET Q2, and the resistor R1 is connected in series with a source electrode or a drain electrode of the N-channel MOSFET Q2.

As FIGS. 2 and 3 shown, the second control circuit 130 according to some embodiments controls the turning on or off of the P-channel MOSFET by controlling the pulse width of the PWM, and the first control circuit 230 controls the turning on or off of the N-channel MOSFET by controlling the pulse width of the PWM.

Preferably, when the N-channel MOSFET is connected in parallel with the LED, the channel number of the N-channel MOSFET is controlled and the PWM signal controlling the P-channel MOSFET are in reverse phase.

Specifically, a control method according to some embodiments is as follows. As shown in FIG. 3, the second control circuit 130 regulates the turning on or off of the P-channel MOSFET Q1 in the constant current source circuit by controlling the pulse-width of the PWM. When the P-channel MOSFET Q1 is turned on or off quickly enough, the constant current source can output a current with adjustable magnitude, while the first control circuit controls a negative signal input end of the gate driver U2 of the N-channel MOSFET Q2 by PWM, so that the gate driver U2 outputs a signal inverted to the PWM, which ensures that the N-channel MOSFET Q2 can be turned on quickly when the P-channel MOSFET Q1 of the constant current source is turned off in each dimming cycle, allows the energy of the inductor element in the previous dimming cycle to flow quickly to the resistor R1 and quickly consume energy through the resistor R1, avoids affecting the stability of the current output by the constant current source, and achieving a smooth and uniform effect of LED dimming.

Figure 4:
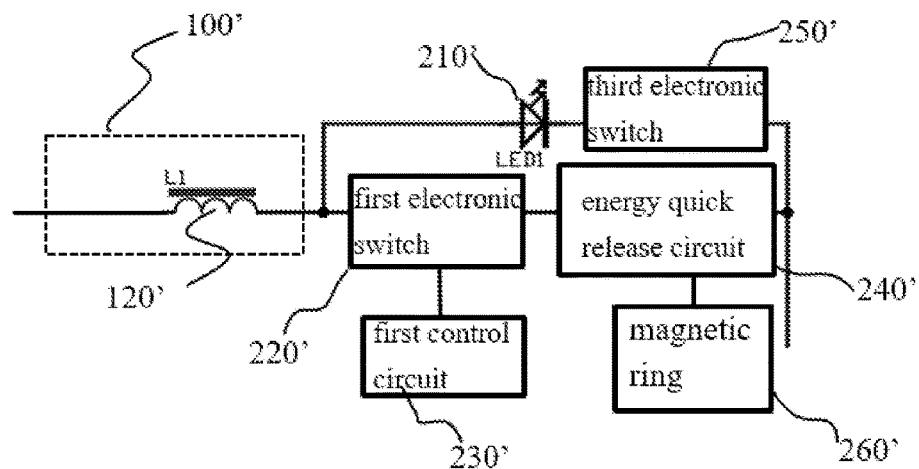
FIG. 4 is a logic circuit diagram of another embodiment according to the present invention.

According to another embodiment, as shown in FIG. 4, an LED dimming device with a high refresh rate and smooth dimming comprises a light source 210' and a power circuit 100' for driving the light source 210'. The power circuit 100' comprises an inductor element 120'. The LED dimming device further comprises an energy release circuit 240' connected in parallel with the light source 210' to release the excess energy of the inductor element 120', and a first electronic switch 220' connected in series with the energy release circuit 240' to control the energy release circuit 240' and driven by the first control circuit 230'.

By providing the energy release circuit 240' connected in parallel with the light source 210', the first electronic switch 220' connected in series with the energy release circuit 240', and controlling quick on-off of the first electronic switch 220' in time using the first control circuit 230', the present embodiment enables the energy release circuit 240' to release the excess energy generated by the inductor element 120' in the power circuit 100' in each cycle more quickly, thereby avoiding unreleased energy to influence charging and discharging of the inductor element 120' in a subsequent cycle, allowing the power circuit 100' to output a current with stable and uniform variation, and achieving a smooth and uniform dimming effect.

Optionally, the power circuit 100' may be a constant current source circuit. The power circuit 100' may be other power circuit having an inductor for powering the light source. An objective of the present embodiment is to eliminate problems of flickering light source and non-smooth dimming due to charging and discharging of the inductor element in the power circuit.

It should be noted that the inductor element comprises a dominant inductor element and a recessive inductor element. The dominant inductor element refers to visible objects. The recessive inductor element refers to that the inductor is integrated into an integrated driver module IC and not visible from outside. As long as an inductor element is included in a functional module topological graph of a specification of the integrated driver module IC, the inductor is considered as a recessive inductor.

According to a preferable embodiment, the energy release circuit 240' includes a resistive load.

The excess energy generated by the inductor element 120' in the previous cycle can be released completely before the next cycle using the resistive load, instead of an inductive load that releases energy in the next cycle after energy accumulation and affects smooth dimming of the light source. The resistive load may be a common resistor, a heating coil, or a resistive light source.

Specifically, the power circuit 100' is controlled by the pulse width of the PWM. A resistance value of the resistive load is $$R \le \frac{2}{f \cdot L \cdot I^2} U_{LED\_THR}^2,$$

where f is a PWM control signal frequency in the power circuit, L is an inductance value of the inductor element in the power supply circuit, I is a full-load current of the light source, and $U_{LED\_THR}$ is a minimum turn-on voltage threshold of the light source. The minimum turn-on voltage threshold of the light source $U_{LED\_THR}$ can be measured experimentally and can also be obtained from a specification of the light source.

According to characteristics of an LR circuit, relationships between a discharge time constant T with a known inductor L and an unknown resistor R is:

$$\tau = \frac{L}{R} \qquad (1)$$

A relationship between an inductor discharge current i and time t is:

$$i(t) = I \cdot e^{-\frac{t}{\tau}} \qquad (2)$$

in the above equation, I is the current before the inductor discharges, i.e., full-load current; e is an Euler's constant.

According to a definition of a root mean square value: a result of averaging a square of a signal waveform current i (t) or a voltage u (t) in a cycle and extracting a square root of the average value. Thus, in one PWM period T, the root mean square value of the inductor discharge current $I_{rms}$ is:

$$I_{rms} = \sqrt{\frac{1}{T}\int_0^T i(t)^2 dt} = \sqrt{\frac{1}{T}\int_0^T (I \cdot e^{-\frac{t}{\tau}})^2 dt} = \sqrt{\frac{\tau \cdot I^2 (1 - e^{-\frac{2T}{\tau}})}{2T}} \qquad (3)$$

An effective value $U_{rms}$ of a voltage at both ends of a release resistor cannot be greater than the minimum turn-on voltage threshold of the light source, otherwise a portion of the current flows and generates lighting with low brightness and trailing shadows, and thus the effect is not good. Combined with the Ohm's law, the voltage relationship is:

$$U_{rms} = I_{rms} R \le U_{LED\_THR} \qquad (4)$$

Combining that a PWM frequency f and a period T has a reciprocal relationship, i.e., f=1/T, simultaneous equations (1), (3), and (4) are solved as:

$$\sqrt{\frac{f \cdot L \cdot R \cdot I^2 (1 - e^{-\frac{2R}{f \cdot L}})}{2}} \le U_{LED\_THR} \qquad (5)$$

In the dimming application of the present invention, $$e^{-\frac{2R}{f \cdot L}}$$

is fairly small in value and is approximately 0, then the above equation is simplified as:

$$\sqrt{\frac{f \cdot L \cdot R \cdot I^2}{2}} \leq U_{LED\_THR} \quad (6)$$

The unknown resistance value of the resistor is soived as $$R \leq \frac{2}{f \cdot L \cdot I^2} U_{LED\_THR}^2.$$

The magnitude of the resistance value of the resistor affects a discharging speed of the inductor element, and a faster discharging speed of the resistor is generally required to increase the refresh rate of the light source, so that a larger resistance value of the resistor is better. Therefore, in the present embodiment, the resistance value takes a maximum value.

Rated power of the resistive load is $$P \geq \frac{f \cdot L \cdot I^2 (1 - e^{-\left(\frac{2}{f \cdot L \cdot I} U_{LED\_THR}\right)^2})}{2},$$

where f is the PWM control signal frequency in the power circuit, L is the inductance value of the inductor element in the power circuit, I is the full-load current of the light source, and $U_{LED\_thr}$ is the minimum turn-on voltage threshold of the light source.

Combining (3), (1), and f=1/T, the resistor power P is:

$$P = I_{rms}^2 R$$

$$= \frac{\tau \cdot I^2 (1 - e^{-\frac{2T}{\tau}})}{2T} R$$

$$= \frac{\frac{L}{R} I^2 (1 - e^{-\frac{2T \cdot R}{L}})}{2T} R$$

$$= \frac{L \cdot I^2 (1 - e^{-\frac{2T \cdot R}{L}})}{2T}$$

$$= \frac{f \cdot L \cdot I^2 (1 - e^{-\frac{2R}{f \cdot L}})}{2}$$

Since $$R \leq \frac{2}{f \cdot L \cdot I^2} U_{LED\_THR}^2, \quad P \geq \frac{f \cdot L \cdot I^2 (1 - e^{-\left(\frac{2}{f \cdot L \cdot I} U_{LED\_THR}\right)^2})}{2}$$

is derived. In addition, if the rated power of the resistive load is too low, the service life thereof is affected, and if the rated power is too high, the price is expensive and causes waste. Therefore, in the present embodiment, the rated power P of the resistive load is controlled to take a minimum value to balance the both aspects.

The energy release circuit in this embodiment is connected in series with a magnetic ring 260' for preventing ringing phenomenon.

Since any transmission line inevitably has lead resistance, lead inductance, and parasitic capacitance, and elements also have parasitic parameters (parasitic resistance, parasitic inductance, and parasitic capacitance). Therefore, a standard pulse signal easily leads to overshoot and ringing phenomena under the influences of the above transmission-line parasitic parameters and element parasitic parameters. The ringing changes the original appearance of the signal waveform to some extent, which results in that, the output current is nonlinear and the dimming effect is affected. The present application effectively prevents the ringing and improves electromagnetic compatibility by connecting appropriate magnetic rings in series.

A third electronic switch 250' is connected in series with the light source 210' to prevent lighting with low brightness generated by the light source 210' due to incomplete energy release of the energy release circuit 240'.

Connecting the third electronic switch 250' in series with the light source 210' can control quick on-off of the circuit where the light source 210' is located, thus increasing light source frequency and improving the dimming effect.

The third electronic switch 250' and the power circuit 100' have the same operating state.

When the power circuit 100' normally outputs currents under the control of the control circuit therein, the third electronic switch 250' is turned on, so that the currents flow through the light source 210' and drive the light source 210' to emit light. When the power circuit 100' stops to normally output currents under the control of the control circuit therein, the third electronic switch 250' is turned off, so that an induced current generated by the inductor element 120' in the power circuit 100' cannot flow through the light source 210' while flowing directly through the energy energy release circuit 240' to be consumed, thereby avoiding lighting with low brightness generated by the light source 210'.

The first electronic switch 220' and the power circuit 100' have opposite operating states.

When the power circuit 100' normally outputs currents under the control of the control circuit therein, the first electronic switch 220' is turned off, so that all the currents flow through the light source 210' and drive the light source 210' to emit light. When the power circuit 100' stops to normally output currents under the control of the control circuit therein, the first electronic switch 220' is turned on, so that an induced current generated by the inductor element 120' in the power circuit 100' is directed to flow through the energy release circuit 240' to be consumed, thereby avoiding influence on charging and discharging of the inductor element 120' in the next cycle, allowing the power output to have stable and uniform variation, and achieving a smooth and uniform dimming effect.

Obviously, the above embodiments of the present invention are merely examples for clear illustration of the present invention, and are not intended to limit the implementation of the present invention. Any modification, equivalent substitution or improvement and the like within the spirit and principle of the claims of the present invention should be included in the scope of claims of the present invention.

The invention claimed is:

1. An LED dimming device with a high refresh rate and smooth dimming, comprising: a constant current source circuit and an LED dimming circuit that are sequentially connected in series,
wherein the LED dimming circuit comprises
an LED, a positive electrode of the LED being connected to an output end of the constant current source circuit;
a first electronic switch;
an energy release circuit, which is connected in series with the first electronic switch to release excess energy in the constant current source circuit, the first electronic switch and the energy release circuit being connected in parallel with the LED; and
a first control circuit, which is connected to the first electronic switch to control turning on or off of the first electronic switch, and
wherein the energy release circuit includes a resistor having a resistance value greater than or equal to 0.3 ohms and smaller than or equal to a resistance value of the LED.

2. The LED dimming device with a high refresh rate and smooth dimming according to claim 1, wherein the constant current source circuit is a DC-DC converter circuit.

3. The LED dimming device with a high refresh rate and smooth dimming according to claim 1, wherein the constant current source circuit comprises
a second control circuit;
a freewheeling semiconductor component;
a second electronic switch; and
an inductor element,
wherein the second electronic switch is connected in series at one end of the inductor element, the other end of the inductor element is connected to the positive electrode of the LED, the second control circuit is connected to the second electronic switch to control turning on or off of the second electronic switch, and the freewheeling semiconductor component is connected between the inductor element and the ground.

4. The LED dimming device with a high refresh rate and smooth dimming according to claim 1, wherein the first control circuit is configured to control the turning on or off of the first electronic switch by controlling a pulse width of a PWM.

5. The LED dimming device with a high refresh rate and smooth dimming according to claim 3, wherein the second control circuit is configured to control the turning on or off of the second electronic switch by controlling a pulse width of a PWM.

6. The LED dimming device with a high refresh rate and smooth dimming according to claim 5, wherein when the first electronic switch is connected in parallel at both ends of the LED, a turn-on signal for controlling the first electronic switch and a PWM signal for controlling the second electronic switch are in reverse phase.

7. The LED dimming device with a high refresh rate and smooth dimming according to claim 1, wherein the LED dimming circuit further comprises a third electronic switch connected in series with the LED.

8. The LED dimming device with a high refresh rate and smooth dimming according to claim 1, wherein the first electronic switch is an N-channel MOSFET.

9. The LED dimming device with a high refresh rate and smooth dimming according to claim 3, wherein the second electronic switch is a MOSFET.

10. An LED dimming device with a high refresh rate and smooth dimming, comprising:
a light source;
a power circuit for driving the light source, which comprises an inductor element;
an energy release circuit, which is connected in parallel with the light source to release excess energy of the inductor element; and
a first electronic switch, which is connected in series with the energy release circuit to control the energy release circuit, the first electronic switch and the energy release circuit both being connected in parallel with the light source, and the first electronic switch being driven by a first control circuit, and
wherein the energy release circuit includes a resistive load, the power circuit is controlled by a pulse width of a PWM, a resistance value of the resistive load is $$R \le \frac{2}{f \cdot L \cdot I^2} U_{LED\_THR}^2,$$

where f is a PWM control signal frequency in the power circuit, L is an inductance value of the inductor element in the power circuit, I is a full-load current of the light source, and $U_{LED\_THR}$ is a minimum turn-on voltage threshold of the light source.

11. The LED dimming device with a high refresh rate and smooth dimming according to claim 10, wherein the power circuit is controlled by a pulse width of a PWM, rated power of the resistive load is $$P \ge \frac{f \cdot L \cdot I^2 (1 - e^{-\left(\frac{2}{f \cdot L \cdot I} U_{LED\_THR}\right)^2})}{2},$$

where f is the PWM control signal frequency in the power circuit, L is the inductance value of the inductor element in the power circuit, I is the full-load current of the light source, and $U_{LED\_THR}$ is the minimum turn-on voltage threshold of the light source.

12. The LED dimming device with a high refresh rate and smooth dimming according to claim 10, wherein the energy release circuit is connected in series with a magnetic ring for preventing ringing phenomenon.

13. The LED dimming device with a high refresh rate and smooth dimming according to claim 10, wherein a third electronic switch is connected in series with the light source to prevent lighting with low brightness of the light source due to incomplete energy release of the energy release circuit.

14. The LED dimming device with a high refresh rate and smooth dimming according to claim 13, wherein the third electronic switch and the power circuit have same operating state.

15. The LED dimming device with a high refresh rate and smooth dimming according to claim 10, wherein the first electronic switch and the power circuit have opposite operating states.

* * * * *